US012741414B2

(12) United States Patent
Olubummo et al.

(10) Patent No.: US 12,741,414 B2
(45) Date of Patent: Sep. 22, 2026

(54) PARTICULATE BUILD MATERIALS FOR THREE-DIMENSIONAL PRINTING

(71) Applicant: PERIDOT PRINT LLC, Palo Alto, CA (US)

(72) Inventors: Adekunle Olubummo, Palo Alto, CA (US); Lihua Zhao, Palo Alto, CA (US); Laurent Herschke, Sant Cugat del Valles (ES)

(73) Assignee: Peridot Print LLC, Palo Alto, CA (US)

( * ) Notice: Subject to any disclaimer, the term of this patent is extended or adjusted under 35 U.S.C. 154(b) by 648 days.

(21) Appl. No.: 18/025,618

(22) PCT Filed: Sep. 15, 2020

(86) PCT No.: PCT/US2020/050824

§ 371 (c)(1),
(2) Date: Mar. 9, 2023

(87) PCT Pub. No.: WO2022/060344

PCT Pub. Date: Mar. 24, 2022

(65) Prior Publication Data

US 2024/0017483 A1 Jan. 18, 2024

(51) Int. Cl.

| | |
|---|---|
| ***C08F 2/46*** | (2006.01) |
| ***B29C 64/165*** | (2017.01) |
| ***B33Y 10/00*** | (2015.01) |
| ***B33Y 70/00*** | (2020.01) |
| ***C08F 2/50*** | (2006.01) |
| ***C08F 210/06*** | (2006.01) |
| ***C08G 61/04*** | (2006.01) |
| *B29K 23/00* | (2006.01) |
| *B29K 105/00* | (2006.01) |

(52) U.S. Cl.

CPC ............ *B29C 64/165* (2017.08); *B33Y 10/00* (2014.12); *B33Y 70/00* (2014.12); *C08F 210/06* (2013.01); *B29K 2023/16* (2013.01); *B29K 2105/251* (2013.01)

(58) Field of Classification Search

CPC ....... B33Y 10/00; B33Y 70/00; C08F 210/06; C08F 287/00; C08F 299/06; C08F 222/06; B29C 64/165; B29K 2105/251; B29K 2023/16

USPC .................................................. 522/1; 520/1

See application file for complete search history.

(56) References Cited

U.S. PATENT DOCUMENTS

| | | | | |
|---|---|---|---|---|
| 5,230,963 | A * | 7/1993 | Knoerzer ................. | C08J 7/048 428/910 |
| 5,599,881 | A | 2/1997 | Xie | |
| 7,183,359 | B2 | 2/2007 | Hanna et al. | |
| 7,989,083 | B2 | 8/2011 | Morikawa et al. | |
| 2016/0369096 | A1 | 12/2016 | Rolland et al. | |
| 2018/0126631 | A1* | 5/2018 | Nauka .................... | B33Y 70/10 |
| 2018/0273743 | A1 | 9/2018 | Sumerlin et al. | |

FOREIGN PATENT DOCUMENTS

| | | | |
|---|---|---|---|
| KR | 10-2003-0069495 | A | 8/2003 |
| WO | 2016/085914 | A1 | 6/2016 |

* cited by examiner

*Primary Examiner* — Jessica Whiteley

(74) *Attorney, Agent, or Firm* — Dierker & Kavanaugh, P.C.

(57) ABSTRACT

A particulate build material for three-dimensional printing can include from about 80 wt % to 100 wt % polymer particles having an average particle size from about 10 μm to about 125 μm. The polymer particles can have a polyolefin polymer backbone with from about 90 mol % to 100 mol % polypropylene polymeric units and from 0 mol % to about 10 mol % polyethylene polymeric units. The polymer particles can further include a crosslinkable component in the form of a maleic anhydride-containing side chain appended to the polyolefin polymer backbone, a thiol-containing side chain appended to the polyolefin polymer backbone, a glycidyl polyhedral oligomeric silsesquioxane compounded with the polyolefin polymer backbone, or a combination thereof.

11 Claims, 6 Drawing Sheets

FIG. 1

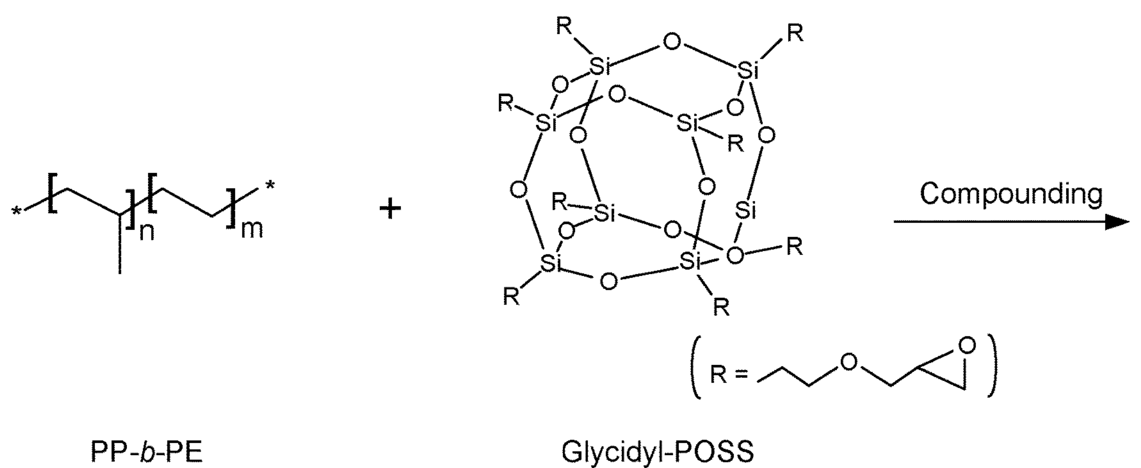
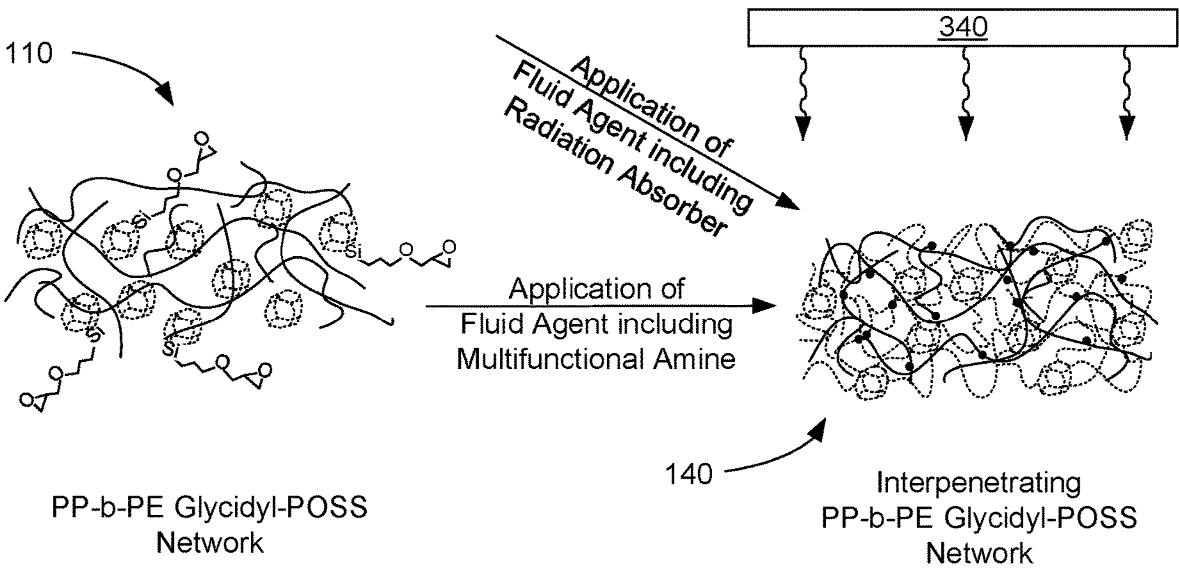
FIG. 3

200 iteratively applying particulate build material as individual build material layers, wherein the particulate build material includes from about 80 wt% to 100 wt% polymer particles, the polymer particles including a polyalkylene polymer backbone including polypropylene polymeric units, the polypropylene-containing polymer particles further including a crosslinkable component appended to or compounded with the polyalkylene polymer backbone, wherein the crosslinkable component is an organic acid anhydride-containing crosslinkable component, a sulfur-containing crosslinkable component, an organosilicon-containing crosslinkable component, or a combination thereof

210 based on a three-dimensional object model, selectively jetting a fusing agent onto the individual build material layers, wherein the fusing agent comprises water and a radiation absorber that absorbs electromagnetic energy and converts the electromagnetic energy to heat

220 based on the three-dimensional object model, selectively jetting a multifunctional compound reactive with the crosslinkable component onto the individual build material layers to cause the polymer particles to become crosslinked, wherein the multifunctional compound is: present in the fusing agent, separately jetted onto the individual build material layers as part of a separate crosslinking agent, or both

230 exposing the particulate build material to electromagnetic energy to selectively fuse the polymer particles in contact with the radiation absorber at individual build material layers, wherein the three-dimensional printed object formed is both physically fused by exposing the particulate build material to the electromagnetic energy and chemically crosslinked at the crosslinkable component

PARTICULATE BUILD MATERIALS FOR THREE-DIMENSIONAL PRINTING

BACKGROUND

Methods of three-dimensional (3D) digital printing, a type of additive manufacturing, have continued to be developed in recent years. Three-dimensional printing technology can shorten the product development cycle by allowing rapid creation of prototype models for reviewing and testing. The concept has been somewhat limited with respect to commercial production capabilities because the range of materials used in three-dimensional printing is likewise somewhat limited. New materials and material combinations may continue to advance this sector of technology. Furthermore, several commercial sectors such as aviation, the medical industry, and more and more other industries are benefitting from the ability to rapidly prototype and/or customize printed parts.

BRIEF DESCRIPTION OF THE DRAWINGS

FIG. 1 is an example chemical preparation of a particulate build material in accordance with the present disclosure;

FIG. 3 is an example chemical preparation of yet another particulate build material in accordance with the present disclosure;

FIG. 5 illustrates an example method of three-dimensional printing in accordance with the present disclosure.

DETAILED DESCRIPTION

Figure 2:
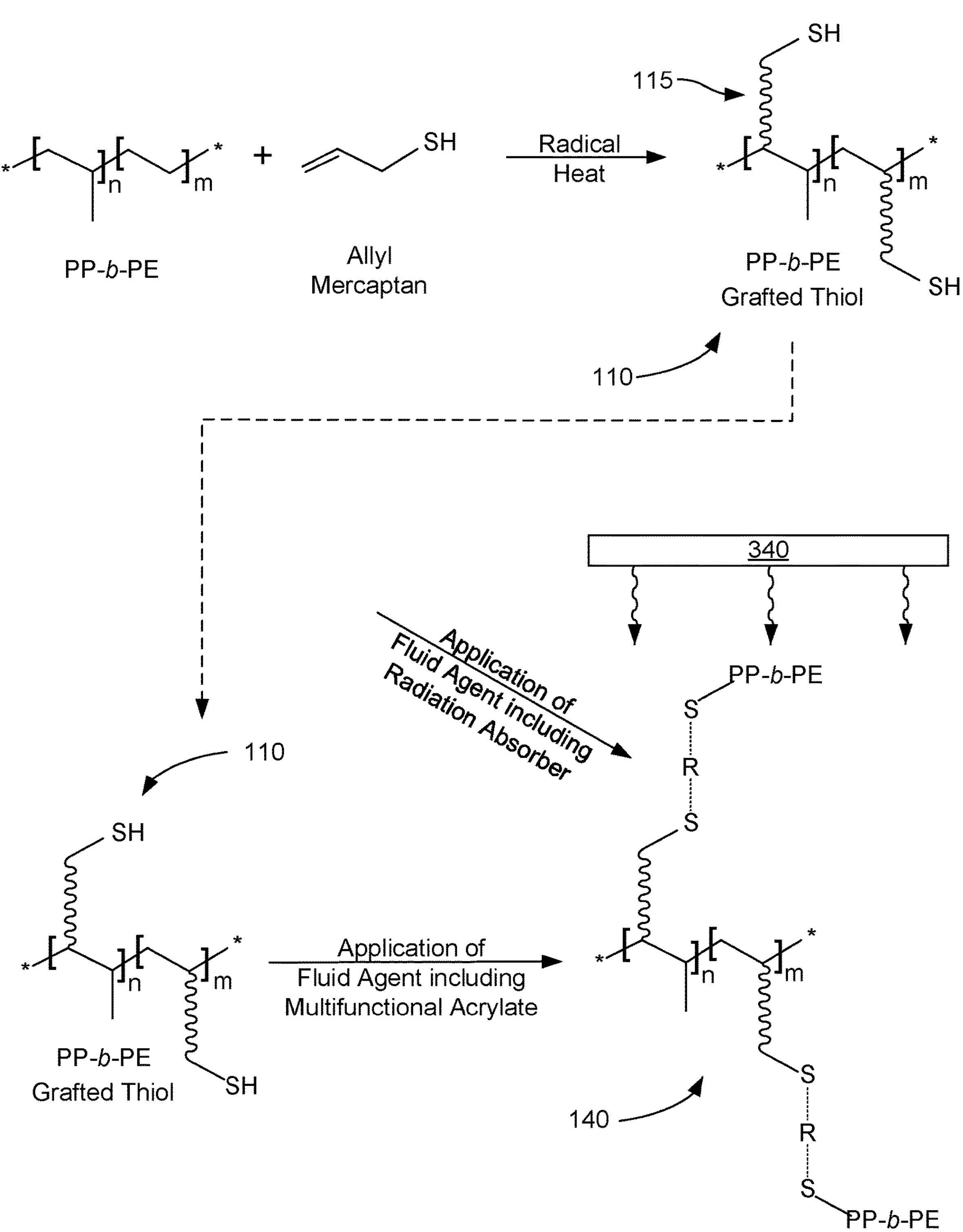
FIG. 2 is an example chemical preparation of another particulate build material in accordance with the present disclosure.

The present disclosure relates to particulate build material, three-dimensional (3D) printing kits, and three-dimensional printing methods in accordance with the present disclosure. In one example, a particulate build material for three-dimensional printing can include from about 80 wt % to 100 wt % polymer particles having an average particle size from about 10 μm to about 125 μm. The polymer particles can have a polyolefin polymer backbone with from about 90 mol % to 100 mol % polypropylene polymeric units and from 0 mol % to about 10 mol % polyethylene polymeric units. The polymer particles can further include a crosslinkable component in the form of a maleic anhydride-containing side chain appended to the polyolefin polymer backbone, a thiol-containing side chain appended to the polyolefin polymer backbone, a glycidyl polyhedral oligomeric silsesquioxane compounded with the polyolefin polymer backbone, or a combination thereof. The crosslinkable component, for example, can be included in the polymer particle at from about 1 wt % to about 9 wt % of the polymer particles. More specifically, in one example, the crosslinkable component includes the maleic anhydride-containing side chain appended to the polyolefin polymer backbone and the crosslinkable component can be included at from about 2.5 wt % to about 6 wt %. In another example, the crosslinkable component includes the thiol-containing side chain appended to the polyolefin polymer backbone and the crosslinkable component is included in the polymer particles at from about 2.5 wt % to about 6 wt %. In another example, the crosslinkable component includes the glycidyl polyhedral oligomeric silsesquioxane compounded with the polyolefin polymer backbone and the crosslinkable component is included in the polymer particles at from about 2.5 wt % to about 6 wt %.

In another example, a three-dimensional printing kit can include a particulate build material comprising from about 80 wt % to 100 wt % polymer particles, the polymer particles including a polyolefin polymer backbone including polypropylene polymeric units, the polymer particles further including a crosslinkable component appended to the polyolefin polymer backbone or compounded with the polyolefin polymer backbone. The crosslinkable component can be an organic acid anhydride-containing crosslinkable component, a sulfur-containing crosslinkable component, an organosilicon-containing crosslinkable component, or a combination thereof. The kit can further include a fusing agent to selectively apply to the particulate build material. The fusing agent can include water and a radiation absorber that absorbs electromagnetic energy and converts the electromagnetic energy to heat. In further detail, a multifunctional compound reactive with the crosslinkable component to crosslink the crosslinkable component can be included as well in the fusing agent and/or in a separate crosslinking agent comprising water and the multifunctional compound. In one example, however, the multifunctional compound can be included in the fusing agent and there is no crosslinking agent present. The polyolefin polymer backbone can, for example, be a copolymer of polypropylene and polyethylene. The crosslinkable component can include a maleic anhydride-containing side chain appended to the polyolefin polymer backbone and the multifunctional compound can include a multifunctional amine. In another example, the crosslinkable component can include a thiol-containing side chain appended to the polyolefin polymer backbone and the multifunctional compound can include a multifunctional acrylate. In still another example, the crosslinkable component can include a glycidyl polyhedral oligomeric silsesquioxane compounded with the polyolefin polymer backbone and the multifunctional compound can include a multifunctional amine. The polymer particles can have an average particle size from about 10 μm to about 125 μm. The radiation absorber can be a metal dithiolene complex, carbon black, a near-infrared absorbing dye, a near-infrared absorbing pigment, metal nanoparticles, a conjugated polymer, or a combination thereof.

In another example of the present disclosure, a method of making a three-dimensional printed object can include iteratively applying particulate build material as individual build material layers, wherein the particulate build material includes from about 80 wt % to 100 wt % polymer particles. The polymer particles can include a polyolefin polymer backbone including polypropylene polymeric units and the polymer particles can further include a crosslinkable component appended to or compounded with the polyolefin polymer backbone. The crosslinkable component can be an organic acid anhydride-containing crosslinkable component, a sulfur-containing crosslinkable component, an organosilicon-containing crosslinkable component, or a combination thereof. In further detail, based on a three-dimensional object model, the method can also include selectively jetting a fusing agent onto the individual build material layers, wherein the fusing agent comprises water and a radiation absorber that absorbs electromagnetic energy and converts the electromagnetic energy to heat, and jetting a multifunctional compound reactive with the crosslinkable component onto the individual build material layers to cause the polymer particles to become crosslinked. The multifunctional compound can be present in the fusing agent and/or separately jetted onto the individual build material layers as part of a separate crosslinking agent. The method further includes exposing the particulate build material to electromagnetic energy to selectively fuse the polymer particles in contact with the radiation absorber at individual build material layers. The three-dimensional printed object formed can be both physically fused by exposing the particulate build material to the electromagnetic energy and chemically crosslinked at the crosslinkable component appended to or compounded with the polyolefin polymer backbone. In some examples, the crosslinkable component includes the maleic anhydride-containing crosslinkable component in the form of a maleic anhydride-containing side chain appended to the polyolefin polymer backbone, and wherein the multifunctional compound includes a multifunctional amine. In other examples, the crosslinkable component includes the thiol-containing crosslinkable component in the form of a thiol-containing side chain appended to the polyolefin polymer backbone, and wherein the multifunctional compound includes a multifunctional acrylate. In other examples, the crosslinkable component includes the organosilicon-containing crosslinkable component in the form of a glycidyl polyhedral oligomeric silsesquioxane compounded with the polyolefin polymer backbone, and wherein the multifunctional compound includes a multifunctional amine.

It is noted that when discussing the particulate build material, the three-dimensional printing kits, and/or the three-dimensional printing methods herein, such discussions can be considered applicable to one another whether or not they are explicitly discussed in the context of that example. Thus, for example, when discussing polymer particles in the context of the particulate build material, such disclosure is also relevant to and directly supported in the context of the three-dimensional printing kit and/or the method of three-dimensional printing, and vice versa. It is also understood that terms used herein will take on their ordinary meaning in the relevant technical field unless specified otherwise. In some instances, there are terms defined more specifically throughout the specification or included at the end of the present specification, and thus, these terms have a meaning consistent with these more specific definitions.

Particulate Build Materials

Polyolefins, such as the polyolefins of the backbone of the polymeric particles described herein, can be crosslinked, but may involve the generation of macroradicals from a radical initiator. These radicals, in addition to providing crosslinking, can result in chain scission, which can lead to decreases in weight average molecular weight of the crosslinked polymer and/or a decrease in molecular weight and poor mechanical properties in some instances. Scission may be avoidable by the addition of a co-agent to a peroxide initiator during crosslinking. Many peroxides have a short half-life and thus provide challenges in formulating particularly stable inkjet formulations, particularly for thermal ejection. By grafting crosslinkable components onto the polyolefin backbone, such as in the presence of a radical initiator and heat (and/or a co-agent or copolymer in some instances), chain scission can be reduced or ameliorated. Furthermore, a multifunctional compound that is reactive with the crosslinkable component appended to the polyolefin (in the form of particulate build material) can be applied thereto using various types of architecture, e.g., fluid ejector such as thermal, piezoelectric, etc. Using a layer-by-layer application process, the particulate build material can be selectively crosslinked. Furthermore, by applying also a radiation absorber on a layer-by-layer basis, application of electromagnetic radiation can also cause the particulate build material to become fused as molten polymer is generated (due to application of electromagnetic energy in the presence of a radiation absorber).

Figure 1:
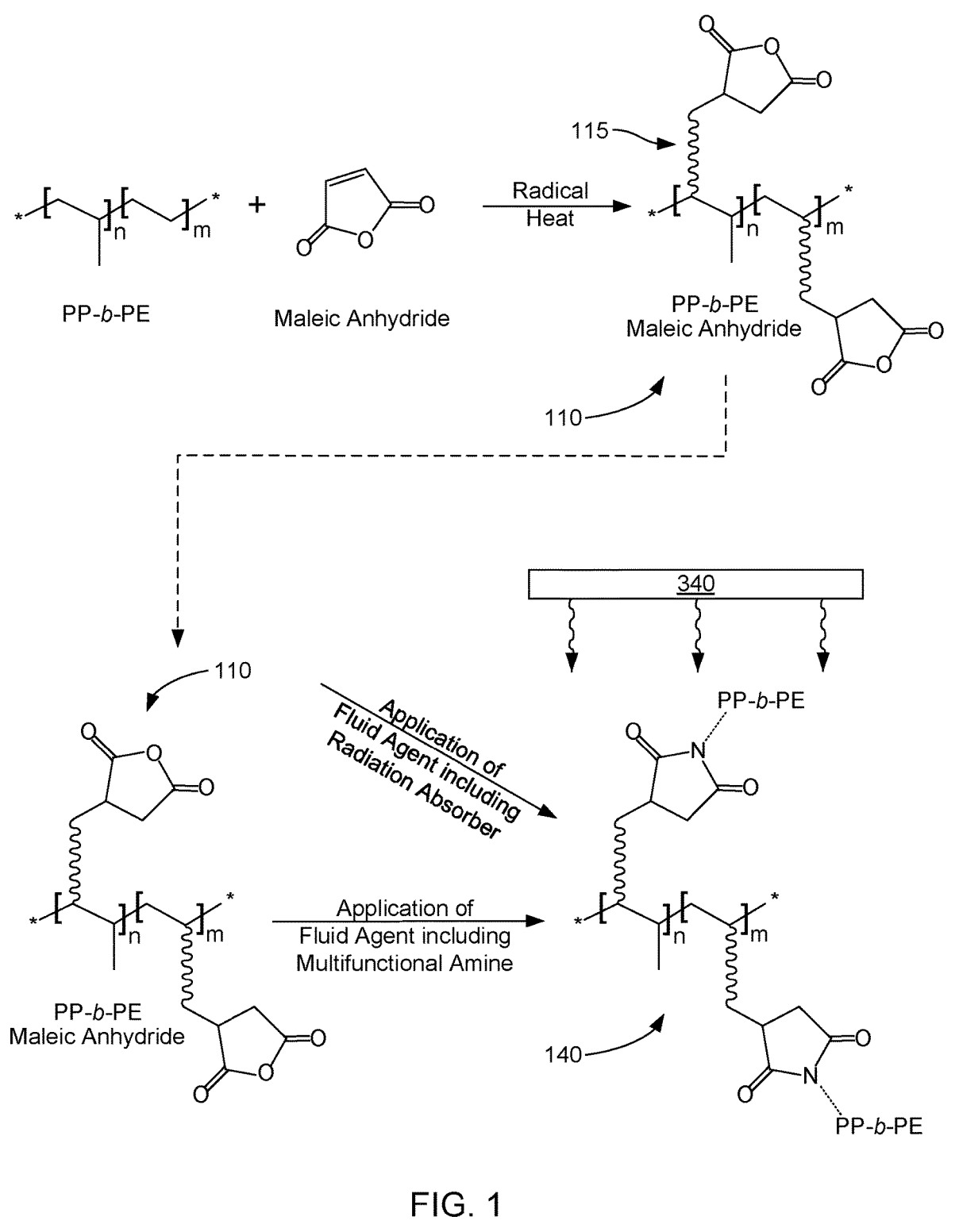

In accordance with this, FIGS. 1-3 illustrate three different example preparative chemical processes that can be used to generate various particulate build material 110 polymers that can be particlized and used for three-dimensional printing, as illustrated further by example in FIG. 5 hereinafter. For example, these polymers can be particlized to have an average particle size from about 10 μm to about 125 μm, from about 10 μm to about 100 μm, from about 20 μm to about 80 μm, or from about 25 μm to about 75 μm, for example. The polymer can be particlized, such as by mechanically grinding, milling or other mechanical sizing method, and/or by precipitation (dissolving in organic solvent and then adding a precipitation compound to precipitate out the polyolefin-containing polymer), for example. Likewise, a combination of precipitation and mechanical sizing. Furthermore, the particulate build materials as prepared in accordance with FIGS. 1-3 are provided by example, as variations of these preparative schemes can likewise be used. The particulate build materials in these examples are based on an example polyolefin backbone with both ethylene groups and propylene groups assembled randomly, but they could be based on polypropylene without the presence of polyethylene (where m=0), and which is reacted or compounded with three particulate crosslinkable components. Upon crosslinking, the crosslinked polymers are shown by example, and thus, provide a partial schematic view of the polymer, crosslinking, etc., as these details can be somewhat random. Thus, there may be structural variability, molecular weight variability, etc. In further detail, in FIGS. 1-3, n can be from about 5 to about 2,000, from about 100 to about 2,000, from about 500 to about 2,000, from about 5 to about 100, from about 5 to about 60, from about 5 to about 50, from about 10 to about 40, on average, per polymer chain; and m can be from 0 to about 20, from about 1 to about 20, from about 1 to about 10, from about 1 to about 5, or from about 2 to about 10, on average, per polymer chain. If m is present, molar ratio of polypropylene groups (n) to polyethylene groups (m) can be from about 4:1 to about 99:1, for example. The polymeric particles formed can include polyolefin-containing polymer chains having a weight average molecular weight from about 8,000 Mw to about 100,000 Mw, from about 10,000 Mw to about 50,000 Mw, or from about 15,000 Mw to about 40,000 Mw.

As shown specifically in FIG. 1, a polyolefin polymer backbone, e.g., (PP-b-PE), is reacted with an organic acid anhydride compound, e.g., maleic anhydride, in the presence of a radical initiator and heated to give a polyolefin polymer backbone with a maleic anhydride-containing side chain, which can be particlized to provide a particulate build material 110 in accordance with examples of the present disclosure. Also shown in FIG. 1 is an example of the chemistry found in the thermally fused and crosslinked part 140 that is also chemically crosslinked at the crosslinkable component. Thermal fusion can occur by application of electromagnetic radiation from an electromagnetic radiation source 340. The fluid agent that is used to apply the radiation absorber can be a fusing agent, and the fluid agent used to apply the multifunctional amine can be either the fusing agent (e.g., the same fluid agent) or can be a separate fluid agent, such as a crosslinking agent, as shown respectively by way of example in FIGS. 4A and 4B hereinafter. Notably, the maleic anhydride-containing side chain can include a linking group 115 connecting the maleic anhydride group to the polyolefin backbone, which is shown schematically in this FIG.

As shown specifically in FIG. 2, a polyolefin polymer backbone, e.g., (PP-b-PE), is reacted with a sulfur-containing compound, e.g., allyl mercaptan, in the presence of a radical initiator and heated to give a polyolefin polymer backbone with a thiol-containing side chain, which can be particlized to provide a particulate build material 110 in accordance with examples of the present disclosure. Also shown in FIG. 2 is an example of the chemistry found in the thermally fused and crosslinked part 140 that is also chemically crosslinked at the crosslinkable component. Thermal fusion can occur by application of electromagnetic radiation from an electromagnetic radiation source 340. The fluid agent that is used to apply the radiation absorber can be a fusing agent, and the fluid agent used to apply the multifunctional acrylate can be either the fusing agent (e.g., the same fluid agent) or can be a separate fluid agent, such as a crosslinking agent, as shown respectively by way of example in FIGS. 4A and 4B hereinafter. In FIG. 2, n can be from about 5 to about 2,000 (or any subrange previously set forth), and m can be from about 0 to about 20 (or any subrange previously set forth). Furthermore, by way of example, R can be any of a number of organic moieties, such as those including ethylene glycol diglycidyl ether, diethylene glycol diglycidyl ether, sorbitol polyglycidyl ether, hydrogenate Bisphenol A diglycidyl ether, hexanediol diglycidyl ether, glycerol polyglycidyl ether, or the like, without limitation. Notably, the thiol-containing side chain can include a linking group 115 connecting the —SH group to the polyolefin backbone, which is shown schematically in this FIG.

As shown specifically in FIG. 3, a polyolefin polymer backbone, e.g., (PP-b-PE), is compounded with an organosilicon-containing compound, e.g., glycidyl-polyhedral oligomeric silsesquioxane (glycidyl-POSS). In this example, compounding can be carried out by co-extrusion of the multiple materials using an extruder, and then the co-extrusion can be particlized using a mill, for example. Upon compounding these two materials, a polyolefin glycidyl-POSS network is formed, which can be particlized to provide a particulate build material 110 in accordance with examples of the present disclosure. Also shown in FIG. 3 is a schematic representation of the polymer/compound entanglement that can occur of the chemistry found in the thermally fused and crosslinked part 140 that is also chemically crosslinked at the crosslinkable component. Thermal fusion can occur by application of electromagnetic radiation from an electromagnetic radiation source 340. The fluid agent that is used to apply the radiation absorber can be a fusing agent, and the fluid agent used to apply the multifunctional amine can be either the fusing agent (e.g., the same fluid agent) or can be a separate fluid agent, such as a crosslinking agent, as shown by way of example in FIGS. 4A and 4B hereinafter. In FIG. 3, n can be from about 5 to about 2,000, from about 100 to about 2,000, from about 500 to about 2,000, from about 5 to about 100, from about 5 to about 60, from about 5 to about 50, or from about 10 to about 40, on average, per polymer chain; and m can be from 0 to about 20, from about 1 to about 20, from about 1 to about 10, from about 1 to about 5, or from about 2 to about 10, on average, per polymer chain; and R can be the ethoxylated glycidyl group shown, for example. Crosslinking may occur at the polyolefin backbone, depending on any side-chains that may be present, but crosslinking can typically occur by epoxide group ring opening.

Three-Dimensional Printing Kits

Figure 4A:
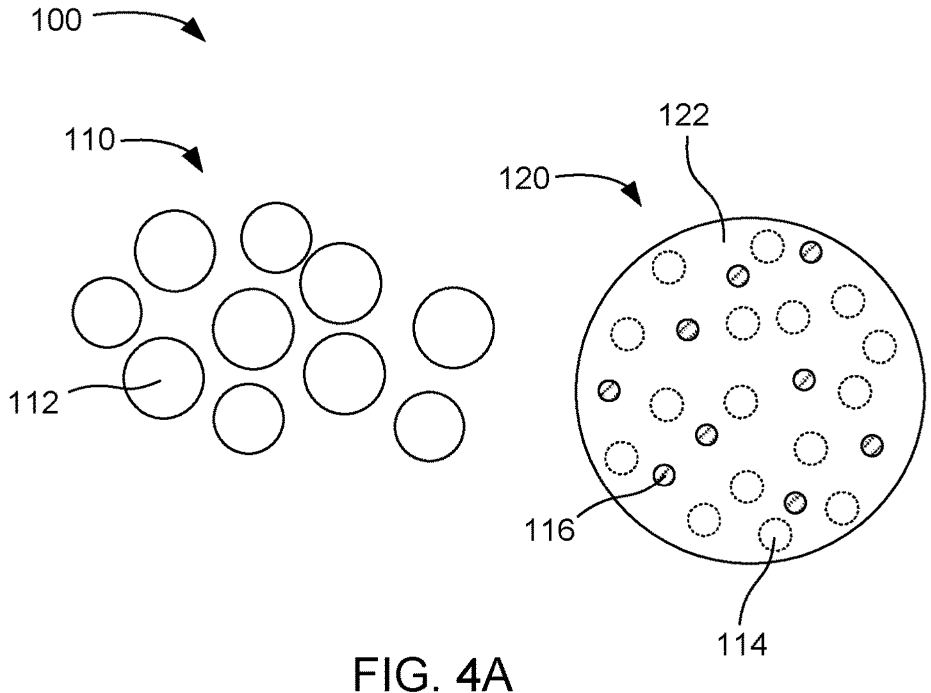
FIG. 4A schematically illustrates an example of a three-dimensional printing kit in accordance with the present disclosure.

The present disclosure relates in some examples to three-dimensional (3D) printing kits. FIG. 4A, for example, provides a schematic illustration of one example three-dimensional printing kit 100 in accordance with examples of the present disclosure. The three-dimensional printing kit includes a particulate build material 110 including polymer particles 112 and a fusing agent 120 including a radiation absorber 114 to selectively apply to the particulate build material. The polymer particles can be included in the particulate build material at from about 80 wt % to 100 wt % by weight (of the particulate build material), and the polymeric particles can include a polyolefin backbone with propylene polymerized monomeric units or a combination of propylene and ethylene polymerized monomeric units. Regarding the crosslinkable component, that portion of the polymer particles can include from about 1 wt % to about 9 wt %, from about 2 wt % to about 7 wt %, or from about 3 wt % to about 5 wt %, based on a total weight of the polymer particles. As mentioned, the crosslinkable component can be in the form of side chains, e.g., maleic anhydride-containing side chain, thiol-containing side chain, etc., appended to the polyolefin backbone; or may be in the form of a crosslinkable component that is compounded with the polyolefin backbone, e.g., glycidyl-POSS. The fusing agent can include water 122 (e.g., in the form of an aqueous liquid vehicle in some examples), and in addition to the radiation absorber in this example, can also include a multifunctional compound 116 that can be used to crosslink the crosslinkable component.

Figure 4B:
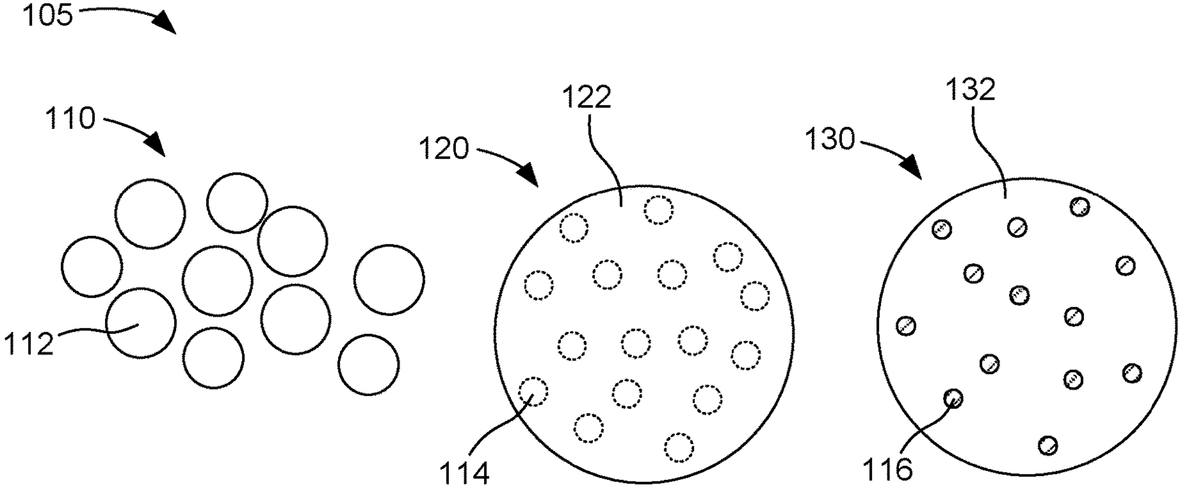
FIG. 4B schematically illustrates another example of a three-dimensional printing kit in accordance with the present disclosure.

As shown by way of example in FIG. 4B, a three-dimensional printing kit 105 can include a particulate build material 110 including polymer particles 112 and a fusing agent 120 including a radiation absorber 114 to selectively apply to the particulate build material. The polymer particles can be included in the particulate build material at from about 80 wt % to 100 wt % by weight (of the particulate build material), and the polymeric particles can include a polyolefin backbone with propylene polymerized monomeric units or a combination of propylene and ethylene polymerized monomeric units. Regarding the crosslinkable component, that portion of the polymer particles can include from about 1 wt % to about 9 wt %, from about 2 wt % to about 7 wt %, or from about 3 wt % to about 5 wt %, based on a total weight of the polymer particles. As mentioned, the crosslinkable component can be in the form of side chains, e.g., maleic anhydride-containing side chain, thiol-containing side chain, etc., appended to the polyolefin backbone; or may be in the form of a crosslinkable component that is compounded with the polyolefin backbone, e.g., glycidyl-POSS. The fusing agent can likewise include water 122 (e.g., in the form of an aqueous liquid vehicle in some examples). However, in this example, the multifunctional compound 116 is present in a crosslinking agent 130 that is a separate fluid than the fusing agent. The crosslinking agent can likewise include water 132 (e.g., in the form of an aqueous liquid vehicle in some examples). The multifunctional compound can be used to cause crosslinking of the crosslinkable components associated with the polyolefin polymer backbone, but in this instance, the multifunctional compound can be selectively applied to the particulate build material independently relative to the fusing agent and the radiation absorber carried therein.

In either of these examples shown at FIGS. 4A and 4B, the three-dimensional printing kit can include other fluid agents, such as multiple fusing agents, hardening agents, other crosslinking agents, detailing agent(s), coloring agent (with pigment and/or dye), etc.

In some examples, the three-dimensional printing kit can include the particulate build material and the fusing agent (or separate fusing agent and crosslinking agent) packaged together. In certain examples, the particulate build material can be in the form of a container or bag of loose powder material. In other examples, the polymeric powder can be in a cartridge designed to fit in a specific three-dimensional printing system. Similarly, the fusing agent and/or the crosslinking agent can be in a cartridge designed for use with a specific three-dimensional printing system, or it can be in another package, such as a bottle(s).

In some examples, the polymeric build material can be capable of being formed into three-dimensional printed parts with a resolution of about 20 μm to about 100 μm, about 30 μm to about 90 μm, or about 40 μm to about 80 μm. As used herein, "resolution" refers to the size of the smallest feature that can be formed on a three-dimensional printed part. The polymeric powder can form layers from about 20 μm to about 100 μm thick, allowing the fused layers of the printed part to have roughly the same thickness. This can provide a resolution in the z-axis (depth) direction of about 20 μm to about 100 μm. Furthermore, in accordance with examples herein, the three-dimensional printing kits (and related methods) that utilize the technology described herein can result in the production of printed objects with high strength due to both thermal fusion and chemical crosslinking, with mechanical strengths, e.g., flexure modulus, of about 1,500 MPa or more, e.g. from about 1,500 MPa to about 100,000 MPa, from about 1,500 MPa to about 20,000 MPa, from about 2,000 MPa to about 50,000 MPa, from about 2,000 MPa to about 20,000 MPa, from about 2,000 MPA to about 10,000 MPa, from about 2,000 MPa to about 6000 MPa, from about 3,000 MPa to about to 20,000 MPa, from about 3,000 MPa to about 10,000 MPa, or from 3,000 MPa to about 6,000 MPa, for example. As a reference, one example of an unmodified polyethylene-polypropylene copolymer has a flexure modulus of about 1080 MPa.

Methods of Three-Dimensional Printing

Figure 5:
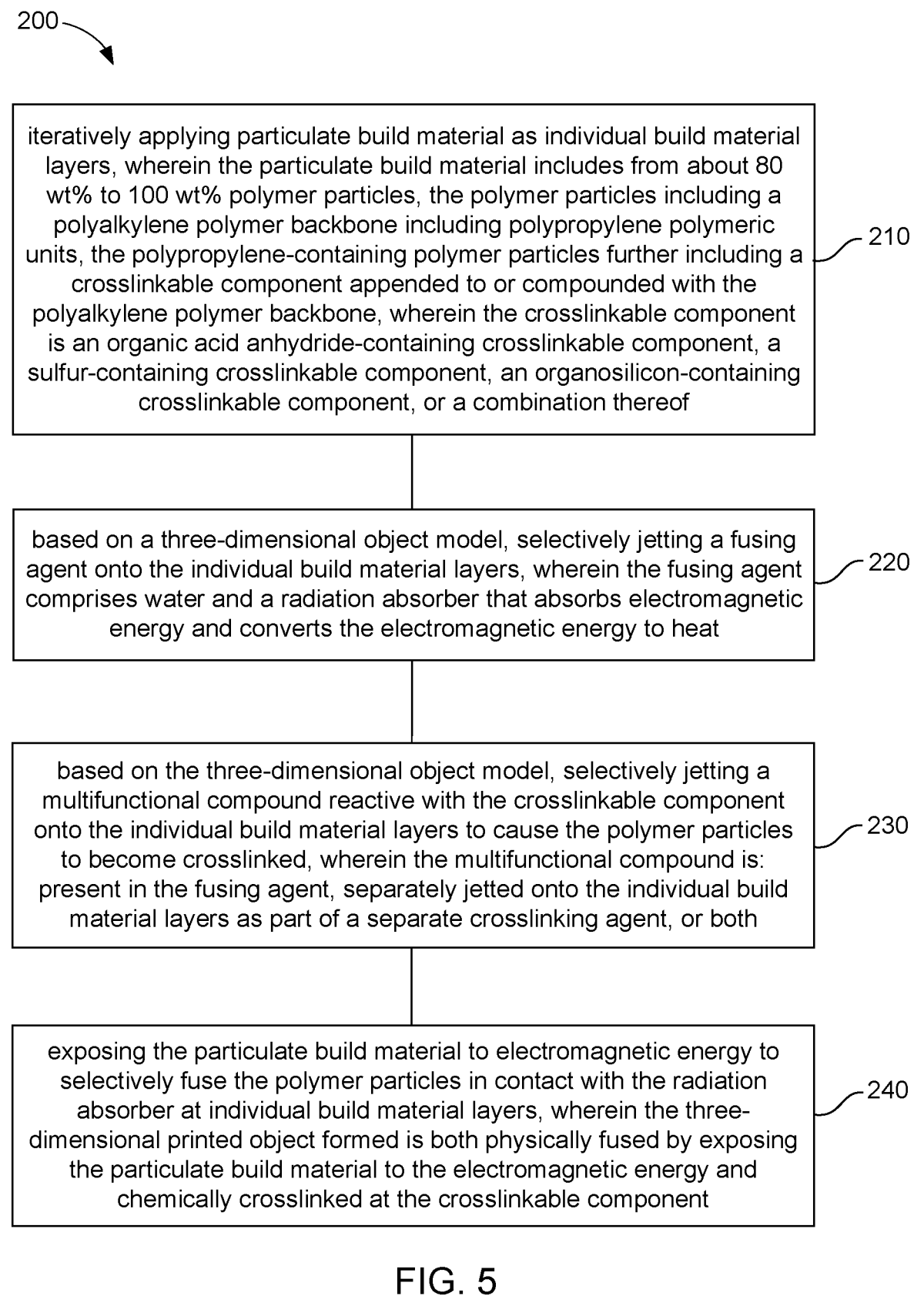

Examples of the present disclosure also include three-dimensional printing methods, such as that shown by way of example in FIG. 5 at 200. In this example, the method can include iteratively applying 210 particulate build material as individual build material layers, wherein the particulate build material includes from about 80 wt % to 100 wt % polymer particle. The polymer particles can include a polyolefin polymer backbone including polypropylene polymeric units, and can further include including a crosslinkable component appended to or compounded with the polyolefin polymer backbone. The crosslinkable component in this example can include an organic acid anhydride-containing crosslinkable component, a sulfur-containing crosslinkable component, an organosilicon-containing crosslinkable component, or a combination thereof. The method can also, based on a three-dimensional object model, include selectively jetting 220 a fusing agent onto the individual build material layers and selectively jetting 230 a multifunctional compound reactive with the crosslinkable component onto the individual build material layers to cause the polymer particles to become crosslinked. The fusing agent can include water and a radiation absorber that absorbs electromagnetic energy and converts the electromagnetic energy to heat. The multifunctional compound can be present in the fusing agent, or can be separately jetted onto the individual build material layers as part of a separate crosslinking agent, or both. The method further may include exposing 240 the particulate build material to electromagnetic energy to selectively fuse the polymer particles in contact with the radiation absorber at individual build material layers. The three-dimensional printed object formed can be both physically fused by exposing the particulate build material to the electromagnetic energy and chemically crosslinked at the crosslinkable component appended to or compounded with the polyolefin polymer backbone.

In some examples, the crosslinkable component can include a maleic anhydride-containing side chain appended to the polyolefin polymer backbone and the multifunctional compound includes a multifunctional amine. In another example, the crosslinkable component can include a thiol-containing side chain appended to the polyolefin polymer backbone and the multifunctional compound includes a multifunctional acrylate. In another example, the crosslinkable component can include a glycidyl polyhedral oligomeric silsesquioxane compounded with the polyolefin polymer backbone and the multifunctional compound includes a multifunctional amine. A combination of these chemistries can also be used in accordance with examples of the present disclosure.

Figure 6:
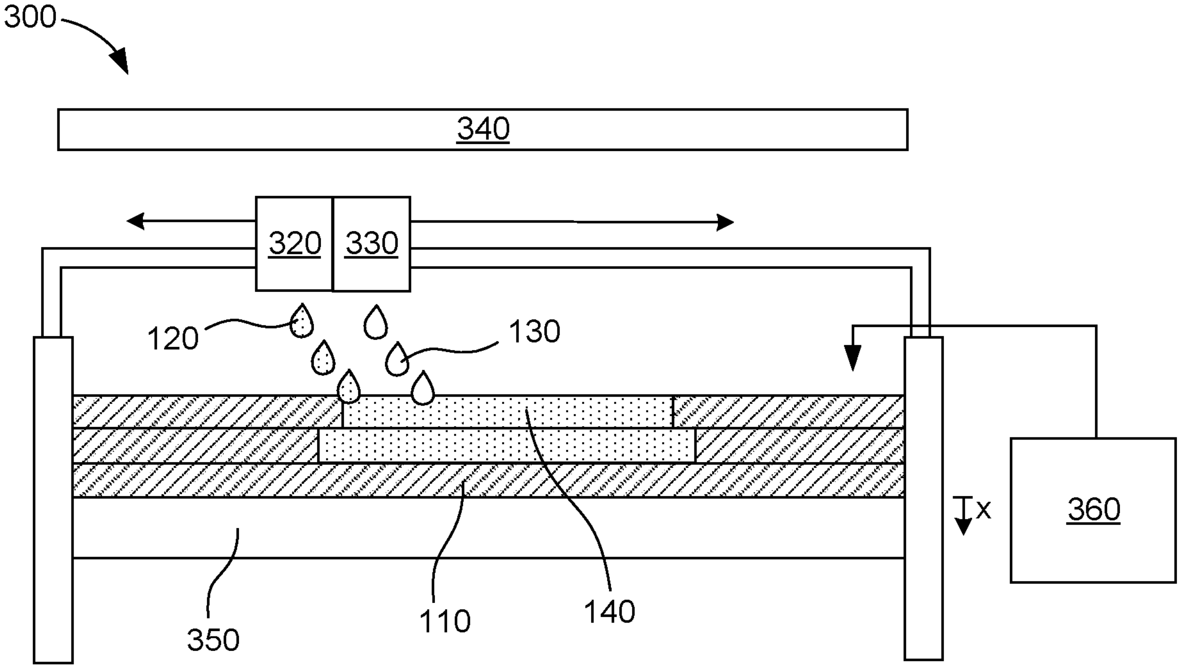
FIG. 6 illustrates an example system for three-dimensional printing in accordance with the present disclosure.

As illustrated in FIG. 6, an example system 300 is shown that can be used with the particulate build material, the three-dimensional printing kits or which can be used to implement methods of the present disclosure, for example. In this example, a three-dimensional printing system 300 can include a build platform 350 supporting a particulate build material 110 (shown in individually applied layers of particulate build material). As shown in this example, a partially printed object in the form of a portion of a thermally fused and crosslinked part is shown at 140, which includes multiple layers that are fused together and crosslinked in accordance with the present disclosure. In building a three-dimensional object or part, a layer of fresh build material powder is supplied from a build material supply 360 over the top of the partially printed object. Fusing agent 120, including a radiation absorber (and in some examples a multifunctional compound) is then applied to the layer of fresh build material from a fusing agent ejector 320 or jet. The fusing agent may include, for example, water and organic co-solvent, and in some instances other compounds such as wetting agent, emulsifier, chelating agent, biocide, surfactant, etc. The radiation absorber may be included in the fusing agent at a concentration as previously described, but in some example, the concentration may be from about 1 wt % to about 10 wt %, for example. The fusing agent ejector can be moveable within the three-dimensional printer so that the fusing agent jet moves across the powder bed to apply the fusing agent at specific locations based on a three-dimensional object model. In this example, a crosslinking agent 130 is also shown that contains a multifunctional compound for promoting crosslinking of the polymeric particles of the particulate build material. The crosslinking agent is then applied to the layer of fresh build material from a crosslinking agent ejector 330 or jet. The crosslinking agent can be applied before or after jetting the fusing agent, but in some examples, the crosslinking agent may be applied after the fusing agent is applied and after the particulate build material is brought to a molten or fusible state by an electromagnetic energy source 340 that emits electromagnetic energy sufficient to cause the radiation absorber to heat up the particulate build material for thermal fusing. By crosslinking as the polymeric powder is melting or after it has melted, but before cooling (or before any appreciable cooling), the crosslinking can provide the benefit of reducing polymer crystallization. For example, the crosslinking occurring while the polymeric particles are in a molten state can retard the mobility of the chains, and thus, resist some recrystallization that may have otherwise occurred. In accordance with individual layers of particulate build material that are added during the build of the three-dimensional object within the powder bed of particulate build material, in this example as shown, a corresponding drop distance (x) by the build platform can occur to accommodate for the added level of particulate build material, which is repeated as layer upon layer of build material are accrued and printed with various fluid agents as described herein.

As used herein, terms such as "jet," "eject," "jetting," ejecting," "ejector," or the like can be used interchangeably, and refers to digital jetting or ejection of various compositional agents described herein. Jetting architecture or ejectors can include thermal or piezo architecture with printheads with printing orifices or openings suitable for ejection of small droplets of fluid. In some examples, the fluid droplet size can be from about 2 picoliters to about 100 picoliters, from about 2 picoliters to about 50 picoliters from about 2 picoliters to about 40 picoliters, from about 2 picoliters to about 30 picoliters, from about 2 picoliters to about 20 picoliters, from about 2 picoliters to about 10 picoliters, from about 3 picoliters to about 20 picoliters, or from about 3 picoliters to about 10 picoliters, or from about 3 picoliters to about 8 picoliters, etc.

In further detail regarding the electromagnetic energy applied by the electromagnetic energy source 340 to the particulate build material (with the fusing agent jetted thereon), such energy can be in the form of infrared energy, near-infrared energy, visible light energy, or other wavelength of energy suitable for fusing the powder build material in the presence of the fusing agent. Suitable electromagnetic energy sources can be, for example, in the form of fusing lamps, such as infrared lamps, and halogen lamps. The fusing lamp can be a stationary lamp or a moving lamp. For example, the lamp can be mounted on a track to move horizontally across the powder bed. Such a fusing lamp can make multiple passes over the particulate build material depending on the amount of exposure determined for use to fuse individual layers or groups of layers. The fusing lamp can irradiate the entire powder bed area with a substantially uniform amount of energy, or can more selectively irradiate the powder bed area. Either way, the presence of the fusing agent in certain locations within the powder bed area impacts whether a given portion of particulate build material becomes fused. This can selectively fuse the portions printed with the fusing agent while leaving the unprinted portions of the polymer powder below the fusing temperature.

In one example, the fusing lamp can be matched with the radiation absorber in the fusing agent so that the source emits wavelengths of light that match the peak absorption wavelengths of the radiation absorber. A radiation absorber with a narrow peak at a particular near-infrared wavelength can be used with an electromagnetic radiation fusing source that emits a narrow range of wavelengths at approximately the peak wavelength of the fusing agent. Similarly, a radiation absorber that absorbs a broad range of near-infrared wavelengths can be used with an electromagnetic radiation fusing source that emits a broad range of wavelengths. Matching the radiation absorber and the electromagnetic radiation fusing source in this way can increase the efficiency of fusing the particulate build material including the composite fiber particles with the fusing agent printed thereon, while the unprinted particulate build material does not absorb as much light and remains at a lower temperature.

In further detail, the three-dimensional printing system can also include preheaters for preheating the particulate build material to a temperature near (but short of) its fusing temperature. In one example, the system can include a print bed heater to heat the build platform 350. In other examples, there can be overhead heaters that apply heat to the powder build material from above, such as radiant heaters, forced air heaters, etc. In some examples, the print bed heater and/or an overhead heater, for example, can apply heat to the particulate build material at a temperature from about 50° C. to about 250° C., for example. In still other examples, the build material supply 315 can also include a supply heater to preheat the powder build material supply prior to spreading a layer of particulate build material on the build platform or a previously applied layer of particulate build material, for example. The supply heater can heat the supply to a temperature from about 80° C. to about 140° C., for example. With these temperatures as guidelines, it is noted that the preheat temperature(s) used can depend on the specific polymeric particulates used in the particulate build material. Keeping the particulate build material near its fusing temperature may allow for less electromagnetic energy to be applied to bring the particulate build material (in contact with the fusing agent) to its fusing temperature, for example. In some other examples, various heating apparatuses, such as the print bed heater, can also be used to anneal the three-dimensional printed object after formation.

Depending on the amount of radiation absorber present in the particulate build material, the absorbance of the radiation absorber, the preheat temperature, and the fusing temperature of the specific polymeric particles present, an appropriate amount of radiation can be supplied from the electromagnetic energy source 340. In some examples, the fusing lamp can irradiate individual layers for about 0.1 seconds to about 10 seconds per pass. In further examples, a fusing lamp can move across the powder bed at a rate of about 1 inch per second to about 60 inches per second to fuse the various layers. In still further examples, the fusing lamp can move across the powder bed at a rate of about 5 inches per second to about 20 inches per second. The energy applied to the particulate build material can be pulsed energy, or continuous energy. Example energy applied can be, for example, at from 5,000 J/mm$^3$ to 50,000 J/mm$^3$, 5,000 J/mm$^3$ to 30,000 J/mm$^3$, 5,000 J/mm$^3$ to 20,000 J/mm$^3$, 7,500 J/mm$^3$ to 50,000 J/mm$^3$, 10,000 J/mm$^3$ to 30,000 J/mm$^3$, etc.

Fusing Agents

To thermally fuse the particulate build material, and particularly the polymeric particles, the temperature of the polymer can be raised by the introduction of electromagnetic energy to a layer of the particulate build material. The electromagnetic energy can interact with a radiation absorber that was ejected at certain locations onto or into the layer of particulate build material, and the interaction between the electromagnetic energy and radiation absorber generates heat sufficient to raise the temperature of the particulate build material to cause the powder to become fused. The radiation absorber can be delivered in a fusing agent formulation by thermal or other ejection technologies.

The radiation absorber can be colored or colorless. In various examples, the radiation absorber can be a metal dithiolene complex, carbon black, a near-infrared absorbing dye, a near-infrared absorbing pigment, metal nanoparticles, a conjugated polymer, or a combination thereof, or combinations thereof. Examples of near-infrared absorbing dyes include aminium dyes, tetraaryldiamine dyes, cyanine dyes, phthalocyanine dyes, dithiolene dyes, and others. In further examples, the fusing agent can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

A dispersant can be included in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctyl-phenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %, from about 1 wt % to about 15 wt %, or from about 1 wt % to about 10 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is printed onto the electroactive polymer powder, and the amount of radiation absorber in the electroactive polymer powder can be from about 0.0003 wt % to about 10 wt %, or from about 0.005 wt % to about 5 wt %, with respect to the weight of the electroactive polymer powder.

As noted previously, in some examples, the fusing agent can also carry a multifunctional compound that acts to provide a chemical moieties to contribute to crosslinking of the crosslinkable component. The multifunction compound may be included in the fusing agent at a concentration suitable for providing a degree of crosslinking to the three-dimensional printed part that may be desired or designed for a given application, but in some examples, the multifunctional compound can be included in the fusing agent at from about 0.05 wt % to about 20 wt %, from about 0.1 wt % to about 10 wt %, from about 1 wt % to about 10 wt %, or from about 0.5 wt % to about 15 wt %, for example.

Crosslinking Agent

In addition to thermal fusion provided by the fusing agent and radiation absorber carried therein, to promote additional part strength and some enhanced mechanical properties, a multifunctional compound, such as a multifunctional amine, a multifunctional acrylate, or the like, can be used to promote crosslinking of the polypropylene-containing polymer of the particulate build material. In these examples, the multifunctional compound can be carried by a separate fluid agent, namely a crosslinking agent. To be clear, in examples where a separate crosslinking agent is used in addition to the fusing agent, a multifunctional compound may or may not also be present in the separate fusing agent. The crosslinking agent can deposited or ejected by thermal or other ejection technologies within a fluid agent onto the particulate build material. The multifunction compound may be included in the crosslinking agent at a concentration suitable for providing a degree of crosslinking to the three-dimensional printed part that may be desired or designed for a given application, but in some examples, the multifunctional compound can be included in the fusing agent at from about 0.05 wt % to about 20 wt %, from about 0.1 wt % to about 10 wt %, from about 1 wt % to about 10 wt %, or from about 0.5 wt % to about 15 wt %, for example.

Other Fluid Agents

In some examples, there can be other fluid agents in the three-dimensional printing kit, such as additional fusing agent formulations, additional crosslinking agent formulations, detailing agent(s), coloring agent (with pigment and/or dye), etc. A coloring agent can be used to add color to the three-dimensional printed object on a layer by layer basis or at specific locations during the build.

In other examples, the three-dimensional printing kit may include a detailing agent. The detailing agent can include a detailing compound. The detailing compound can be capable of reducing the temperature of the particulate build material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

In some examples, the detailing compound can be a solvent that evaporates at the temperature of the powder bed. In some cases the powder bed can be preheated to a preheat temperature within about 10° C. to about 70° C. of the fusing temperature of the polymer powder. Depending on the type of polymer powder used, the preheat temperature can be in the range of about 90° C. to about 200° C. or more. The detailing compound can be a solvent that evaporates when it comes into contact with the powder bed at the preheat temperature, thereby cooling the printed portion of the powder bed through evaporative cooling. In certain examples, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof. In some examples, the detailing agent can be mostly water. In a particular example, the detailing agent can be about 85 wt % water or more. In further examples, the detailing agent can be about 95 wt % water or more. In still further examples, the detailing agent can be substantially devoid of radiation absorbers. That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

In some examples, the detailing agent can include a polar organic solvent having a boiling point from about 200° C. to about 320° C. in an amount from about 0.1 wt % to about 20 wt % with respect to the total weight of the detailing agent. In further examples, the detailing agent can include a dihydrazide antioxidant in an amount from about 0.1 wt % to about 10 wt %. In still further examples, the detailing agent can include both the polar organic solvent having a boiling point from about 200° C. to about 320° C. and the dihydrazide antioxidant.

Liquid Vehicles

The fluid agents of the present disclosure, e.g., fusing agent(s), crosslinking agent(s), coloring agent(s), detailing agent(s), or the like, can include various active ingredients, e.g., radiation absorber, multifunctional compound, colorant, detailing compound, etc. In these and other examples, the fluid agents can be formulated with a liquid vehicle and the active ingredient(s). The active ingredients can be as described in detail elsewhere herein. With respect to the liquid vehicle, such formulations can include the active ingredient(s) and water, and co-solvent(s) present in total at from about 0.5 wt % to about 50 wt %, depending on the jetting architecture, e.g., thermal, piezo, etc. Further, in some examples, various liquid vehicles can include non-ionic, cationic, and/or anionic surfactants and can be present, ranging from about 0.01 wt % to about 10 wt %. In one example, the surfactant can be present in an amount from about 1 wt % to about 5 wt %. The liquid vehicle can include dispersants which may be applicable to disperse solids in the formulation, and if present, can be included in an amount from about 0.5 wt % to about 3 wt %. Other vehicle components that can be included may be in the form of biocides, viscosity modifiers, materials for pH adjustment, sequestering agents, preservatives, or the like. In one example, the liquid vehicle(s) can be predominantly water.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100; Triton™ X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof.

DEFINITIONS

It is noted that, as used in this specification and the appended claims, the singular forms "a," "an," and "the" include plural referents unless the context clearly dictates otherwise.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though individual members of the list are individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if individual numerical values and sub-ranges are explicitly recited. As an illustration, a numerical range of "about 1 wt % to about 5 wt %" should be interpreted to include the explicitly recited values of about 1 wt % to about 5 wt %, and also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

PROPHETIC EXAMPLES

The following illustrates examples of the present disclosure. However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

Example 1—Preparation of Particulate Build Material of Polyolefin with Appended Maleic Anhydride-Containing Side Chain A particulate build material including a maleic anhydride-containing side chain appended to a polyolefin polymer backbone is prepared by reacting the polypropylene-containing polymer shown in FIG. 1 as PP-b-PE (where n is 1000 to 2000 and m is 10 to 20) with maleic anhydride monomer in the presence of a radical initiator, e.g., benzoyl peroxide or azobisisobutyronitrile, and heat to carry out the reaction. The weight ratio of the PP-b-PE to maleic anhydride monomer in the reaction mixture in this example is within the range of about 50:1 to about 20:1. The bond formed between the polyolefin backbone and the maleic anhydride-containing side chain is formed as a result of the radicals generated on the PP-b-PE polyolefin backbone and the maleic anhydride. Once the particulate build material polymer is formed, the polymer is dissolved in an organic solvent and then precipitated out via the addition of a second precipitating compound, for example. Precipitation can be halted once a desired particle size is reached or the reaction can be designed by adding an amount of precipitating compound relative to the polymer content to form an average particle size of about 40 μm to about 75 μm, for example. Alternatively, the particulate build material polymer can be collected and mechanically milled, ground down, or otherwise sized to an average particle size of about 40 μm to about 75 μm, for example. In further detail, a combination of precipitation and mechanical sizing can be used to arrive at the particle size for use in a particular three-dimensional printing application. In some instances, the particulate build material is admixed with other powder materials, such as inorganic and/or organic fillers, provided the polypropylene-containing polymer is included in the particulate build material at from 80 wt % to 100 wt %.

Example 2—Preparation of Particulate Build Material of Polyolefin with Appended Thiol-Containing Side Chain A particulate build material including a thiol-containing side chain appended to a polyolefin polymer backbone is prepared by reacting the polypropylene-containing polymer shown in FIG. 2 as PP-b-PE (where n is 1000 to 2000 and m is 10 to 20) with allyl mercaptan monomer in the presence of a radical initiator, e.g., benzoyl peroxide or azobisisobutyronitrile, and heat to carry out the reaction. The weight ratio of the PP-b-PE to allyl mercaptan monomer in the reaction mixture in this example is within the range of about 50:1 to about 20:1. The bond formed between the polyolefin backbone and the thiol-containing side chain is formed due to the radicals generated on the PP-b-PE polyolefin backbone and the allyl mercaptan. Once the particulate build material polymer is formed, the polymer is dissolved in an organic solvent and then precipitated out via the addition of a second precipitating compound, for example. Precipitation can be halted once a desired particle size is reached or can be designed by adding an amount of precipitating compound relative to the polymer content to form an average particle size of about 40 μm to about 75 μm, for example. Alternatively, the particulate build material polymer can be collected and mechanically milled, ground down, or otherwise sized to an average particle size of about 40 μm to about 75 μm, for example. In further detail, a combination of precipitation and mechanical sizing can be used to arrive at the particle size for use in a particular three-dimensional printing application. In some instances, the particulate build material is admixed with other powder materials, such as inorganic and/or organic fillers, provided the polypropylene-containing polymer is included in the particulate build material at from 80 wt % to 100 wt %.

Example 3—Preparation of Particulate Build Material of Polyolefin with Glycidyl-POSS A particulate build material including polypropylene-containing polymer backbone compounded with a polyglycidyl-polyhedral oligomeric silsesquioxane (glycidyl-POSS) is prepared by co-extruding the polypropylene-containing polymer shown in FIG. 3 as PP-b-PE (where n is 1000 to 2000 and m is 10 to 20) with the glycidyl-POSS under heat to form an entangled and compounded blend of the two polymers. The weight ratio of the PP-b-PE to glycidyl-POSS in the compounding mixture in this example is within the range of about 50:1 to about 20:1. After co-extrusion, the compounded material is particlized using a mechanical sizing process, such as milling, to arrive at an average particle size of about 40 μm to about 75 μm, for example. In some instances, the particulate build material is admixed with other powder materials, such as inorganic and/or organic fillers, provided the polypropylene-containing polymer is included in the particulate build material at from 80 wt % to 100 wt %.

Example 4—Fluid Agents

Several different fluid agents are prepared, as follows.

Fusing Agent 1—A first fusing agent includes water, from about 15 wt % to about 50 wt % organic co-solvent, and from 1 wt % to 8 wt % radiation absorber, such as carbon black, that absorbs electromagnetic energy and converts the electromagnetic energy to heat.

Fusing Agent 2—A second fusing agent includes water, from 15 wt % to 50 wt % organic co-solvent, from 1 wt % to 8 wt % radiation absorber, such as carbon black, and from 0.5 wt % to 10 wt % multifunctional amine.

Fusing Agent 3—A third fusing agent includes water, from 15 wt % to 50 wt % organic co-solvent, from 1 wt % to 8 wt % radiation absorber, such as carbon black, and from 0.5 wt % to 10 wt % multifunctional acrylate.

Crosslinking Agent 1—A first crosslinking agent includes water, from 15 wt % to 50 wt % organic co-solvent, and from 0.5 wt % to 10 wt % multifunctional amine. Crosslinking Agent 2—A second crosslinking agent includes water, from 15 wt % to 50 wt % organic co-solvent, and from 0.5 wt % to 5 wt % multifunctional acrylate.

Example 5—Three-Dimensional Printing

Three-dimensional printed articles is formed using the particulate build materials of Examples 1-3 in combination with the fusing agents and/or crosslinking agents of Example 4 by iteratively applying layers of the respective particulate build materials at thicknesses of about 100 μm to about 125 μm followed by application of radiation absorber and multifunctional compound, either by application of Fusing Agent 1 in combination with Crosslinking Agents 1 and 2, or by application of Fusing Agents 2 or 3 (as Fusing Agents 2 and 3 both include both a radiation absorber and a multifunctional compound). The combination of application of electromagnetic energy and the presence of the radiation absorber is used to bring the individual layers to a temperature ranging from about 80° C. to about 140° C., depending on the specific particulate build materials melting temperatures.

What is claimed is:

1. A three-dimensional printing kit, comprising:

a particulate build material comprising from about 80 wt % to 100 wt % of polymer particles, the polymer particles including a polyolefin polymer backbone including polypropylene polymeric units, the polymer particles further including a crosslinkable component appended to or compounded with the polyolefin polymer backbone, wherein the crosslinkable component is an organic acid anhydride-containing crosslinkable component, a sulfur-containing crosslinkable component, an organosilicon-containing crosslinkable component, or a combination thereof;

a fusing agent to be selectively applied to the particulate build material, wherein the fusing agent comprises water and a radiation absorber that absorbs electromagnetic energy and converts the electromagnetic energy to heat; and a multifunctional compound reactive with the crosslinkable component to crosslink the crosslinkable component, wherein the multifunctional compound is included in: i) the fusing agent, ii) a crosslinking agent comprising water and the multifunctional compound, or iii) both the fusing agent and the crosslinking agent, wherein the multifunctional compound is selected from the group consisting of a multifunctional amine and a multifunctional acrylate.

2. The three-dimensional printing kit of claim 1, wherein the multifunctional compound is included in the fusing agent and there is no crosslinking agent present.

3. The three-dimensional printing kit of claim 1, wherein the polyolefin polymer backbone is a copolymer of polypropylene and polyethylene.

4. The three-dimensional printing kit of claim 1, wherein the crosslinkable component includes a maleic anhydride-containing side chain appended to the polyolefin polymer backbone, and wherein the multifunctional compound includes the multifunctional amine.

5. The three-dimensional printing kit of claim 1, wherein the crosslinkable component includes a thiol-containing side chain appended to the polyolefin polymer backbone, and wherein the multifunctional compound includes the multifunctional acrylate.

6. The three-dimensional printing kit of claim 1, wherein the crosslinkable component includes a glycidyl polyhedral oligomeric silsesquioxane compounded with the polyolefin polymer backbone, and wherein the multifunctional compound includes the multifunctional amine.

7. The three-dimensional printing kit of claim 1, wherein the polymer particles have an average particle size ranging from about 10 μm to about 125 μm.

8. The three-dimensional printing kit of claim 1, wherein the radiation absorber is a metal dithiolene complex, carbon black, a near-infrared absorbing dye, a near-infrared absorbing pigment, metal nanoparticles, a conjugated polymer, or a combination thereof.

9. A method of making a three-dimensional printed object, the method comprising:

iteratively applying a particulate build material as individual build material layers, wherein the particulate build material includes from about 80 wt % to 100 wt % of polymer particles, the polymer particles including a polyolefin polymer backbone including polypropylene polymeric units, the polymer particles further including a crosslinkable component appended to or compounded with the polyolefin polymer backbone, wherein the crosslinkable component is an organic acid anhydride-containing crosslinkable component, a sulfur-containing crosslinkable component, an organosilicon-containing crosslinkable component, or a combination thereof;

based on a three-dimensional object model, selectively jetting a fusing agent onto the individual build material layers, wherein the fusing agent comprises water and a radiation absorber that absorbs electromagnetic energy and converts the electromagnetic energy to heat;

based on the three-dimensional object model, selectively jetting a multifunctional compound reactive with the crosslinkable component onto the individual build material layers to cause the polymer particles to become crosslinked, wherein the multifunctional compound is selected from the group consisting of a multifunctional amine and a multifunctional acrylate, and wherein the multifunctional compound is: i) present in the fusing agent, ii) separately jetted onto the individual build material layers as part of a separate crosslinking agent, or iii) both present in the fusing agent and separately jetted onto the individual build material layers as part of the separate crosslinking agent; and exposing the particulate build material to electromagnetic energy to selectively fuse the polymer particles in contact with the radiation absorber at the individual build material layers, wherein the three-dimensional printed object formed is both physically fused by exposing the particulate build material to the electromagnetic energy and chemically crosslinked at the crosslinkable component appended to or compounded with the polyolefin polymer backbone.

10. The method of claim 9, wherein:

the crosslinkable component includes the organic acid anhydride-containing crosslinkable component and is present as a maleic anhydride-containing side chain appended to the polyolefin polymer backbone, and wherein and the multifunctional compound includes the multifunctional amine; or the crosslinkable component includes the sulfur-containing crosslinkable component and is present as a thiol-containing side chain appended to the polyolefin polymer backbone, and wherein the multifunctional compound includes the multifunctional acrylate; or the crosslinkable component includes the organosilicon-containing crosslinkable component and is present as a glycidyl polyhedral oligomeric silsesquioxane compounded with the polyolefin polymer backbone, and wherein the multifunctional compound includes the multifunctional amine; or a combination thereof.

11. The three-dimensional printing kit of claim 1, wherein the polymer particles consist of the polyolefin polymer backbone and the crosslinkable component appended to the polyolefin polymer backbone, wherein the crosslinkable component makes up from about 1 wt % to about 9 wt % of a total weight of the polymer particles.

* * * * *